United States Patent [19]

Ogino

[11] Patent Number: 5,483,510
[45] Date of Patent: Jan. 9, 1996

[54] OPTICAL INFORMATION RECORDING AND REPRODUCING APPARATUS THAT APPROXIMATES AN ERROR SIGNAL WHEN ONE CANNOT BE DETECTED

[75] Inventor: Tsukasa Ogino, Yokohama, Japan

[73] Assignee: Canon Kabushiki Kaisha, Tokyo, Japan

[21] Appl. No.: 389,628

[22] Filed: Feb. 15, 1995

Related U.S. Application Data

[63] Continuation of Ser. No. 57,456, May 7, 1993, abandoned, which is a continuation of Ser. No. 553,654, Jul. 18, 1990, abandoned.

[30] Foreign Application Priority Data

Jul. 18, 1989 [JP] Japan ................................ 1-183581
Jun. 29, 1990 [JP] Japan ................................ 2-170067

[51] Int. Cl.$^6$ ............................................... G11B 7/09
[52] U.S. Cl. ........................... 369/44.34; 369/44.32; 369/44.28; 369/44.35
[58] Field of Search ..................... 369/44.34, 44.25, 369/44.32, 44.35, 44.41, 44.11, 44.28, 44.42, 32, 44.27, 124

[56] References Cited

U.S. PATENT DOCUMENTS

4,785,442 11/1988 Ohtake et al. .................. 369/44.32
4,918,680 4/1990 Miyasaka ....................... 369/44.34

*Primary Examiner*—Georgia Y. Epps
*Assistant Examiner*—Muhammad N. Edun
*Attorney, Agent, or Firm*—Fitzpatrick, Cella, Harper & Scinto

[57] ABSTRACT

The present invention provides an optical information recording and reproducing apparatus wherein a light beam spot is properly illuminated onto a recording medium by detecting a tracking error signal and/or a focus error signal in a time shared mode and by activating a tracking actuator and/or a focus actuator, thereby performing the recording and reproducing of information. The apparatus of the present invention includes a device for approximating an error signal on the basis of a plurality of error signals previously detected, when an error signal cannot be detected during an error signal detecting operation.

20 Claims, 6 Drawing Sheets

OPTICAL INFORMATION RECORDING AND REPRODUCING APPARATUS THAT APPROXIMATES AN ERROR SIGNAL WHEN ONE CANNOT BE DETECTED

This application is a continuation of prior application, Ser. No. 08/057,456 filed May 7, 1993 now abandoned, which application is a continuation of prior application, Ser. No. 07/553,654 filed Jul. 18, 1990, both now abandoned.

BACKGROUND OF THE INVENTION

1. Field of the Invention

The present invention relates to a recording and reproducing apparatus for an optical recording medium, and more specifically, it relates to an optical information recording and reproducing apparatus having a function for correcting the abnormity and/or impossibility of detection of a servo error signal.

2. Related Background Art

In the past, for example, optical discs have been known as an optical recording medium. The optical disc has concentric or spiral tracks and is divided into a plurality of sectors for permitting the recording of data having variable lengths and high speed access. The recording and reproducing of information regarding an optical disc is performed by illuminating a light beam spot emitted from an optical head onto a desired track of the disk while effecting focusing and tracking servo control.

The above servo control is generally divided into two groups, i.e., an analog servo control and a digital servo control, on the basis of the difference of signals to be handled. Recently, an interest has been directed to the digital servo control, since it can provide a stable servo control operation.

Figure 1:
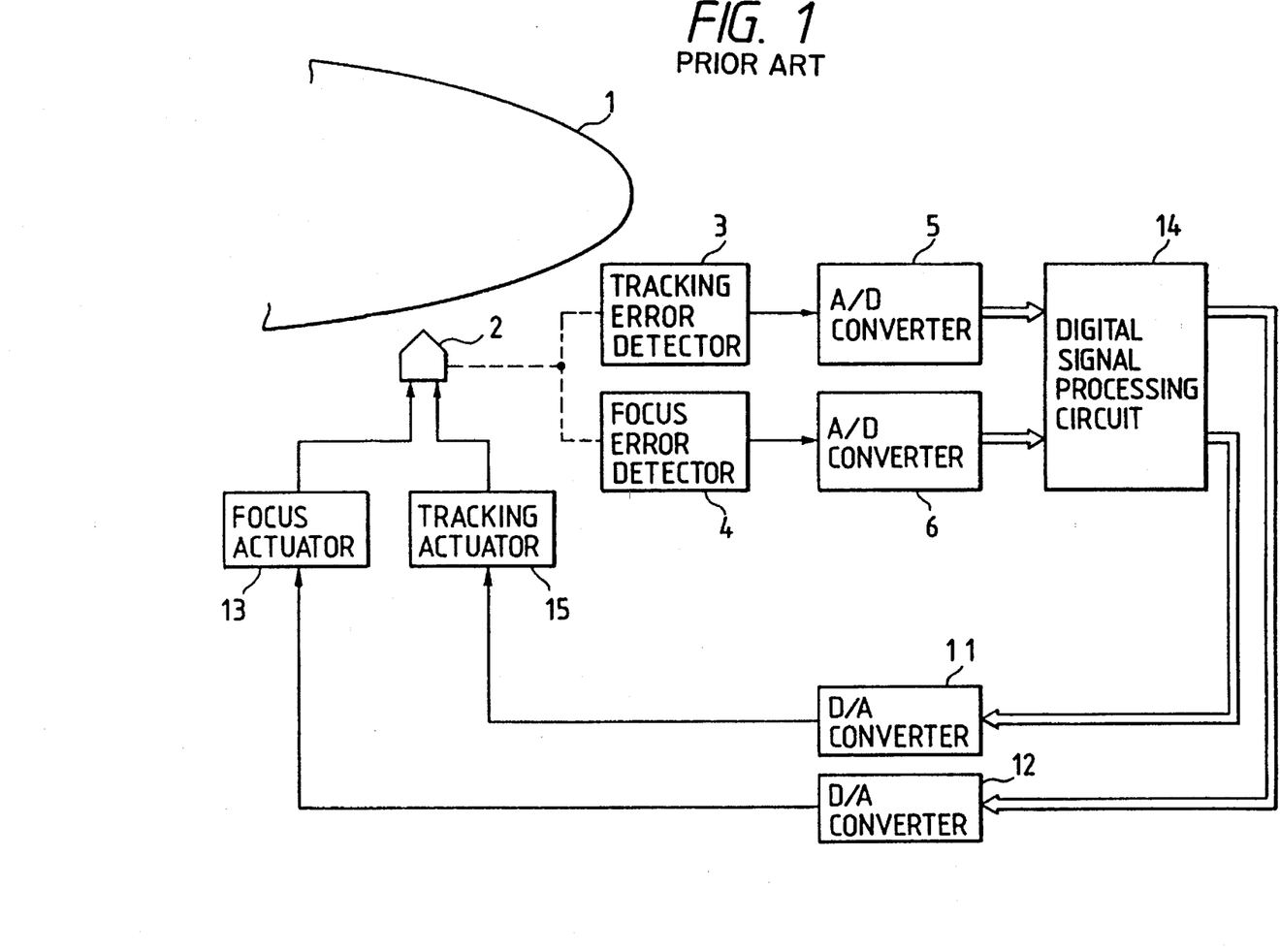
FIG. 1 is a block diagram showing an example of a conventional digital servo control apparatus.

FIG. 1 shows an example of a conventional digital servo control apparatus. In FIG. 1, reference numeral 1 denotes an optical disc as a recording medium; 2 denotes an optical system for an optical head; 3 denotes a tracking error detector for detecting a tracking error signal on the basis of an output from the optical system 2; 4 denotes a focus error detector for detecting a focus error signal on the basis of an output from the optical system 2. With respect to the tracking error detector 3 and the focus error detector 4, a known detecting method used in the optical information recording and reproducing apparatus can be adopted. For example, a push-pull method can be adopted for the tracking error detection, and an astigmatism method can be adopted for the focus error detection. Incidentally, reference numerals 5 and 6 denote A/D converters for A/D converting the error signals outputted from the error detectors 3 and 4 into digital signals, respectively; 14 denotes a digital signal processing circuit; 11 and 12 denote D/A converters for converting the digital signals from the digital signal processing circuit 14 into analog signals; and 13 and 15 denote a tracking actuator and a focus actuator, respectively, for driving the optical system 2 of the optical head to predetermined directions. Next, the operation of the digital servo control apparatus having the above-mentioned arrangement will be explained.

First of all, when it is desired to record or reproduce information with respect to the optical disk 1 by means of the optical system 2, the optical system 2 is servo-controlled by the focus actuator 13 and the tracking actuator 15. This is achieved by detecting the tracking error signal and the focus error signal on the basis of the reflected light from the optical disc 1, by calculating the detected signals using predetermined exchange equations by means of the digital signal processing circuit to obtain a desired control amount, and by activating the actuators 13, 15 on the basis of the control amount.

The servo control mode can further be divided into a continuous servo control system and a sample servo control system. The former is a system for performing the servo control by detecting the tracking error signal and the focus error signal at all times during the recording and reproducing operation, and the latter is a system for performing the tracking servo control and focus servo control by detecting the tracking error signal and the focus error signal in a time shared control with the use of servo bytes provided on the fronts of the respective sectors as shown in FIGS. 2A–2C.

Next, the control with the sample servo control system by using the above-mentioned digital servo control apparatus will be explained.

Figure 2A:
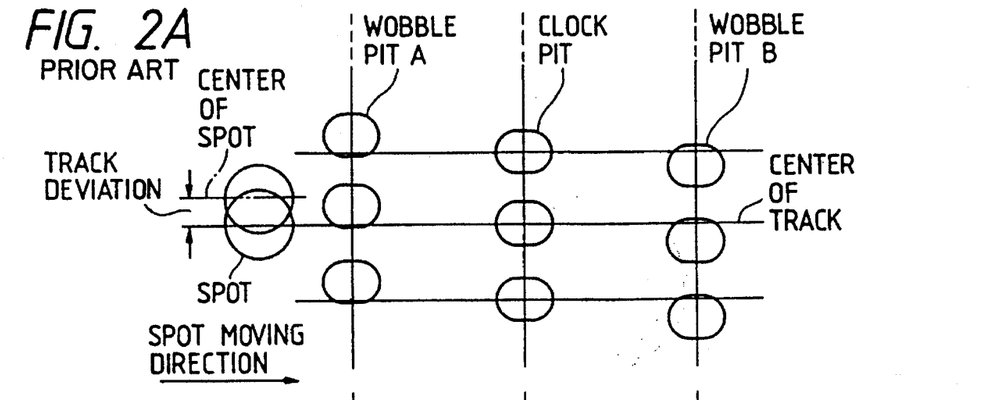
FIGS. 2A to 2C are views showing a control with a sample servo control system performed by using the digital servo control apparatus of FIG. 1.

FIG. 2A shows an arrangement of wobble pits and clock pits in the servo byte area used in the sample servo control system. The wobble pits serve to detect the tracking error, and the clock pits serve to generate a clock signal for reproducing the data.

Figures 2B, 2C:
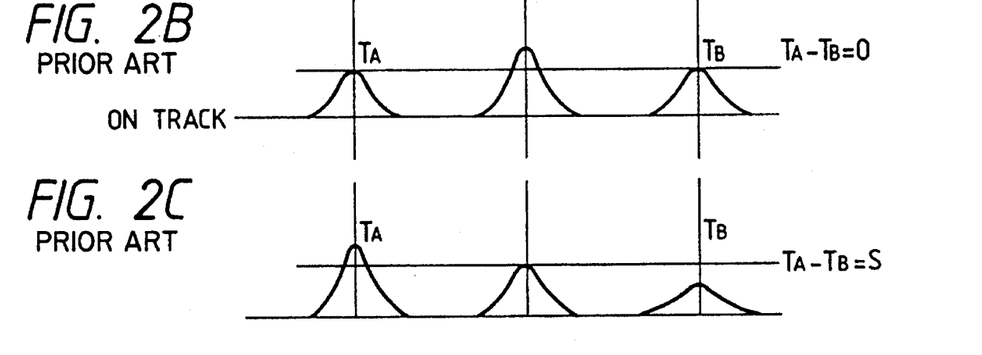
Figure 3:
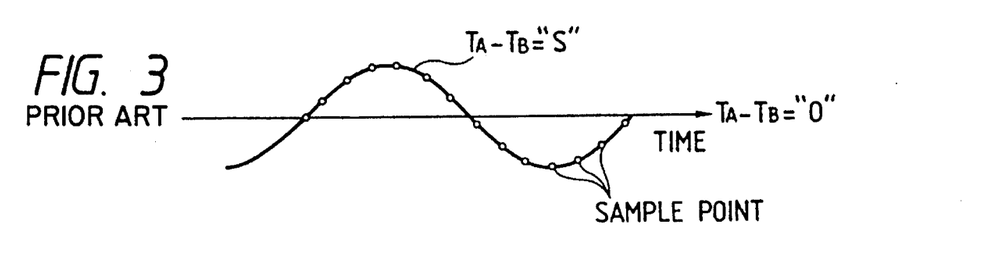
FIG. 3 is a graph showing the change in a value S of $T_A - T_B$ obtained from FIGS. 2A to 2C.

In the servo byte area, when the light beam spot is in an on-track condition, outputs as shown in FIG. 2B can be obtained, as the light beam spot is moved. The tracking error signal is obtained as "0" by A/D converting the outputs and then by calculating them on the basis of the subtraction $T_A - T_B$ by means of the digital signal processing circuit. If the light beam spot is slightly shifted toward the wobble pit A, as shown in FIG. 2C, the tracking error signal S is obtained by calculating the subtraction $T_A - T_B$. If the light beam spot passes across the track, the value S of $T_A - T_B$ will be changed as shown in FIG. 3. The focus error signal is detected at a mirror plane (not shown) provided behind the wobble pits. Thereafter, as in the conventional method, the control amount for the tracking and focus actuators is sought by performing the calculation on the basis of the predetermined exchange equations in the digital signal processing circuit, and the actuators are activated on the basis of the control amount. In this way, the control amount for the tracking and focus actuators obtained for each servo byte area is held for a given time until a new control amount is sought in the next servo byte area. And, the control in a certain servo byte area is performed on the basis of the control amount held for that byte area.

However, in the control system as the above-mentioned sample servo control system, wherein the control is performed by detecting the tracking error signal and the focus error signal in a time shared mode, the following problem arose.

If during the error detecting operation the tracking error signal or the focus error signal is not obtained due to a defect in and/or damage to the disc or due to the presence of dust, the desired control for the light beam spot cannot be effected until the next error signals are obtained.

In order to solve such a problem, conventionally, if the error signal could not be obtained, the servo control was performed by using the error signal obtained just before the occurrence of the impossibility of detection.

However, with this conventional method, accurate control is not always obtained; particularly, if the error signal cannot be obtained continuously for a long time, the conventional method worsens the control accuracy and cannot provide an adequate countermeasure.

SUMMARY OF THE INVENTION

The present invention aims to eliminate the above-mentioned conventional drawbacks, and an object of the present invention is to provide an optical information recording and reproducing apparatus which can perform an accurate servo control for a light beam spot even if the error signal cannot be detected during the error signal detecting operation in a servo control system wherein the servo control is performed by detecting a tracking error signal and/or a focus error signal in a time shared mode.

The above object is achieved by providing an optical information recording and reproducing apparatus in which a light beam spot is properly illuminated onto a recording medium by detecting a tracking error signal and/or a focus error signal in a time shared mode and by activating a tracking actuator and/or a focus actuator, thereby performing the recording and reproducing of information, and wherein means is provided for estimating an error signal on the basis of a plurality of error signals previously detected, when an error signal cannot be detected during the error signal detecting operation.

DESCRIPTION OF THE PREFERRED EMBODIMENTS

Figure 4:
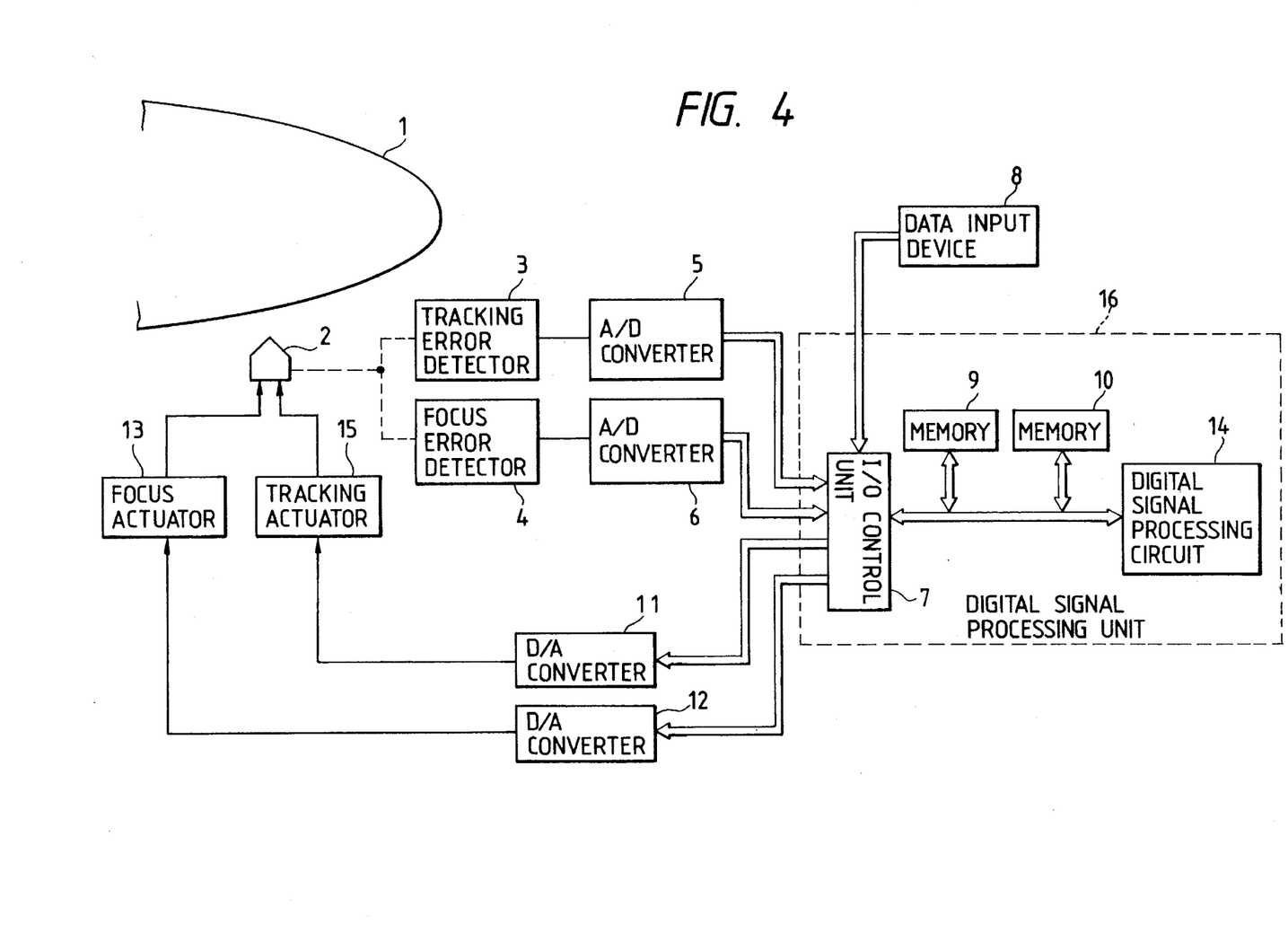
FIG. 4 is a block diagram showing an example of a construction of an optical information recording and reproducing apparatus according to a first embodiment of the present invention.

FIG. 4 is a block diagram showing an example of a construction of an optical information recording and reproducing apparatus according to the present invention.

In FIG. 4, reference numeral 7 denotes an input/output control unit (hereinafter, referred to an "I/O control unit"), and 9 and 10 denote memories. The reference numeral 8 denotes an external data input device. Incidentally, an optical system 2, tracking actuator 15, focus actuator 13, tracking error detector 3, focus error detector 4, A/D converters 5, 6, D/A converters 11, 12 and digital signal processing circuit 14 may be the same as those of the conventional apparatus shown in FIG. 1.

Next, an operation of a servo control apparatus constructed as above will be explained.

Figure 5:
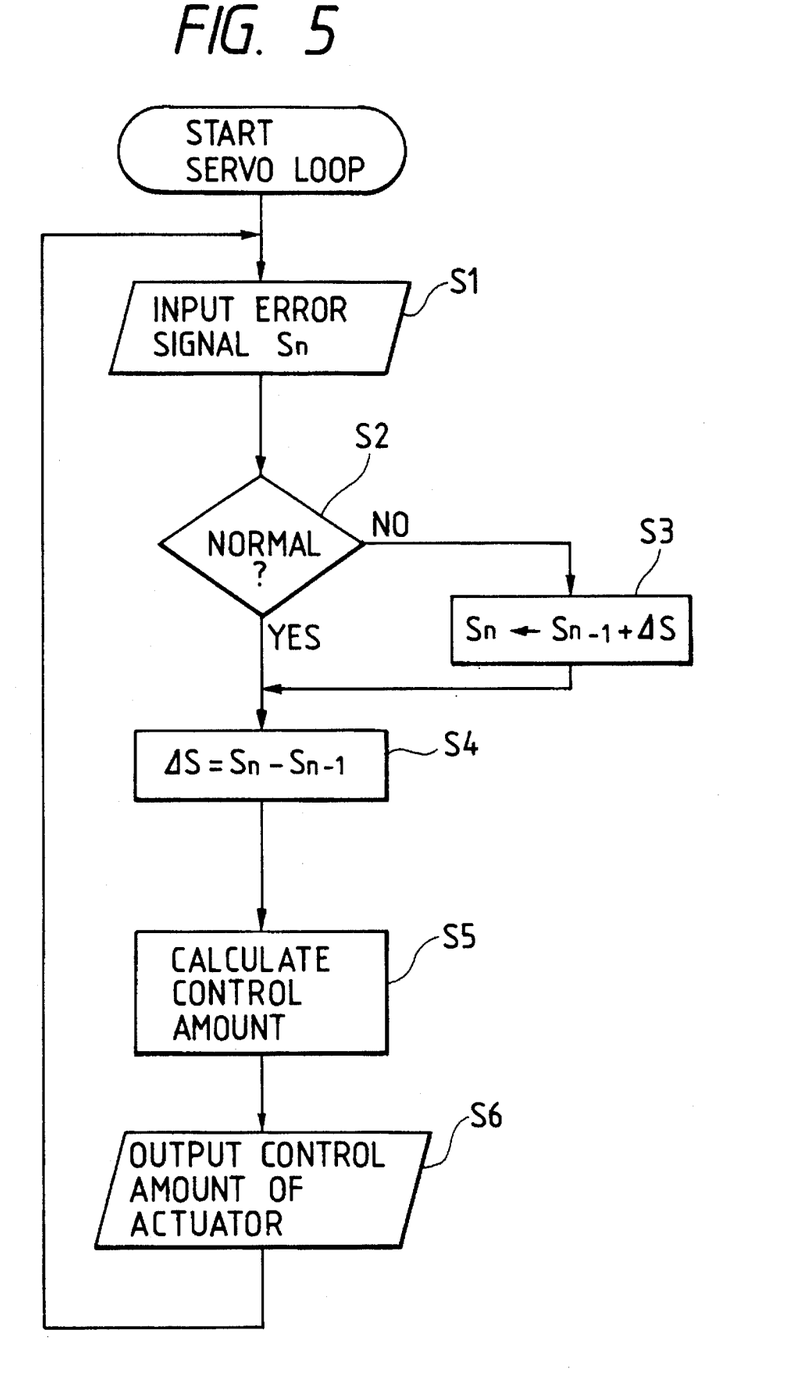
FIG. 5 is a flow chart showing an operation in the servo control by means of the apparatus according to the first embodiment of the present invention of FIG. 4.

FIG. 5 is a flow chart showing an operation in the servo control performed by means of the apparatus according to a first embodiment of the present invention.

Hereinafter, the operation of the servo control apparatus during the reproducing operation will be fully explained with reference to FIGS. 4 and 5.

Incidentally, the description is given here with respect to a tracking servo control, but the present invention can be similarly adapted to a focus servo control.

The reflected light beam spot from the servo byte area of the optical disc 1 is introduced into the optical system 2, where a tracking error signal is detected by the tracking error detector 3. The tracking error signal is converted into a digital signal by the A/D converter 5 and then is inputted to the digital signal processing circuit 14 through the I/O control unit 7 (step S1). The digital signal processing circuit 14 judges whether the error signal is normal or abnormal on the basis of a change in level of the signal (step S2). If the signal is an abnormal one due to a defect in and/or damage to the disc or due to the presence of dust, an error signal Sn is sought by adding a first previous data Sn–1 to a difference $\Delta S$ between the second previous data Sn–2 and the first previous data Sn–1 ($\Delta S = Sn-1-Sn-2$) (step S3). And, a difference $\Delta S$ between the obtained error signal Sn and the first previous error signal Sn in the previous servo byte area is sought, and these values Sn and $\Delta S$ are temporarily stored in the memory 9 (step S4). Next, the digital signal processing circuit 14 seeks a control amount by calculating the value Sn on the basis of a predetermined exchange equation (step S5). The calculated result is outputted to the D/A converter 11 through the I/O control unit 7 (step S6). The control amount is converted into an analog amount by the D/A converter 11 and is inputted to the tracking actuator 15, thus performing the tracking servo control. The tracking servo control is continued with the control amount until a new control amount is obtained in the next servo byte area. On the other hand, in the step S2, if the signal is judged as a normal one, the digital signal processing circuit 14 seeks a difference $\Delta S$ between the value Sn and the first previous error signal Sn–1, and these values Sn and $\Delta S$ are temporarily stored in the memory 9.

Figure 6:
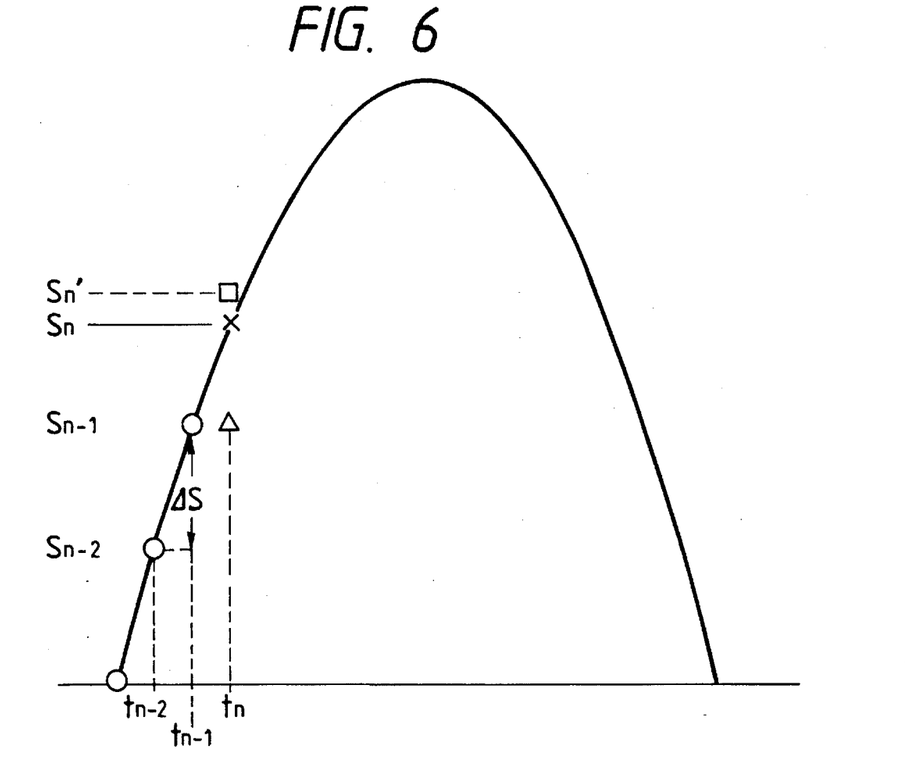
FIG. 6 is a graph showing an example of sample data of an error signal in the apparatus according to the first embodiment.

An example of a sample data of the error signal is schematically shown in FIG. 6.

The sample data inputted to the digital signal processing circuit 14 is normally inputted in the order of Sn–2, Sn–1, Sn. As mentioned above, if the signal Sn is an abnormal signal and thus, the true value Sn cannot be obtained, in the conventional method, the value Sn–1 was used as the error signal Sn (shown by $\Delta$ in FIG. 6). However, in the present invention, the difference $\Delta S = Sn-1-Sn-2$ is sought, and a value $Sn' = Sn-1+\Delta S$ is used as the error signal Sn (shown by $\square$ in FIG. 6).

As shown in FIG. 6, it can be seen that the value Sn' of the present invention closely resembles the true error signal Sn.

Figure 7:
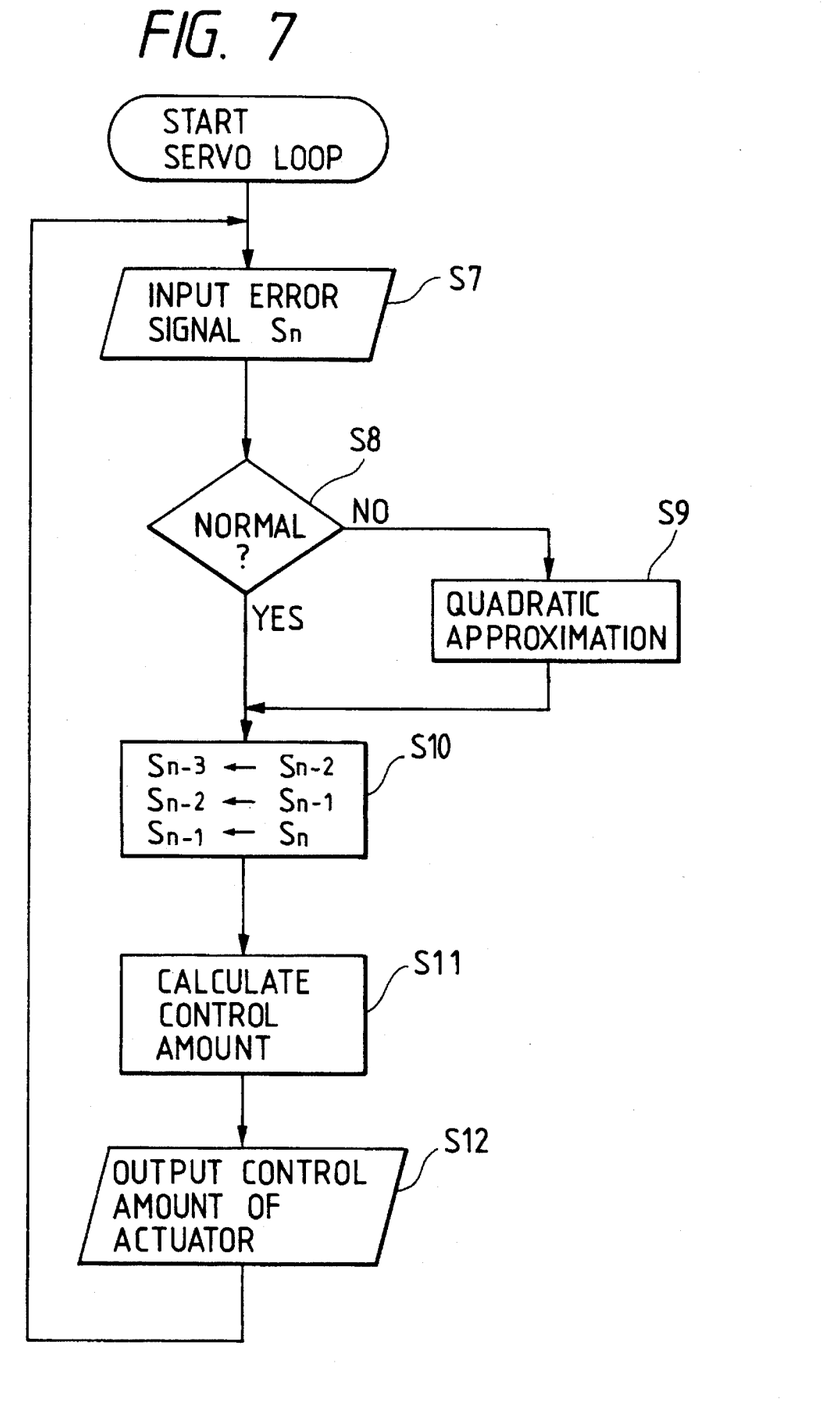
FIG. 7 is a flow chart showing an operation in the servo control by means of an optical information recording and reproducing apparatus according to a second embodiment of the present invention.

Next, a second embodiment of the present invention will be explained. FIG. 7 is a flow chart showing an operation in the servo control performed by means of an apparatus according to a second embodiments.

Hereinafter, the operation of the servo control apparatus during the reproducing operation will be fully described in connection with the second embodiment with reference to FIG. 7. Incidentally, the arrangement of the apparatus itself is the same as that of the previous embodiment.

The reflected light beam spot from the servo byte area of the optical disc 1 is introduced into the optical system 2, where a tracking error signal is detected by the tracking error detector 3. The tracking error signal is converted into a digital signal by the A/D converter 5 and then is inputted to the digital signal processing circuit 14 through the I/O control unit 7 (step S7). The digital signal processing circuit 14 judges whether the error signal is normal or abnormal (step S8). If the signal is an abnormal one due to a defect in and/or damage to the disc or due to the presence of dust, an error signal Sn is sought from the following equation by using the data stored in the memory 9 (step S9):

$$Sn=(Sn-3+Sn-2+Sn-1)/3+(Sn-1-Sn-3)$$

And, the digital signal processing circuit 14 seeks a control amount by calculating the value Sn on the basis of a predetermined exchange equation (step S11). The calculated result is outputted to the D/A converter 11 through the I/O control unit 7 (step S12). The control amount is converted into an analog amount by the D/A converter 11 and is inputted to the tracking actuator 15, thus performing the tracking servo control. The tracking servo control is continued with the control amount until a new control amount is obtained in the next servo byte area.

On the other hand, in the step S8, if the signal is judged as a normal one, the second previous tracking error signal Sn-2 detected in the previous servo byte area, the first previous tracking error signal Sn-1, and the present tracking error signal Sn are stored in the memory 9 in a time shared mode, as the third previous or three steps prior tracking error signal Sn-3, second previous or two steps prior tracking error signal Sn-2, and first previous tracking error signal Sn-1, respectively (step S10).

Incidentally, in this second embodiment, while an example that the contents in the memory 9 are rewritten in order whenever a new tracking error signal Sn is obtained to store the data in the time shared mode was explained, for example, only the latest error signal Sn may be stored in an address next to the address of the just previously stored error signal in the memory 9.

Figure 8:
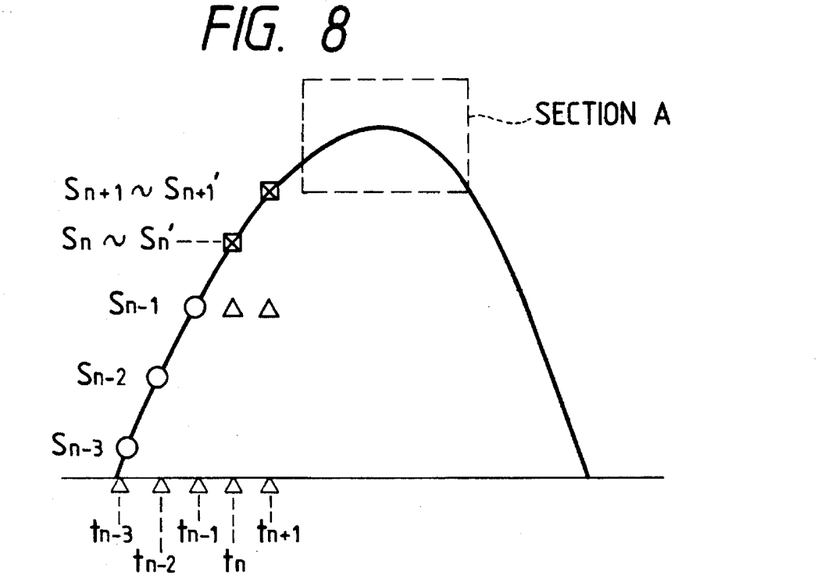
FIG. 8 is a graph showing an example of sample data of an error signal in the apparatus according to the second embodiment.

An example of the sample data of the error signal is schematically shown in FIG. 8, relating to the second embodiment.

The sample data inputted to the digital signal processing circuit 14 is normally inputted in the order Sn-3, Sn-2, Sn-1, Sn. As mentioned above, if the signal Sn is an abnormal signal and thus, the true value Sn cannot be obtained, in the conventional method, the value Sn-1 was used as the error signal Sn (shown by Δ in FIG. 6).

However, in the present invention, a value Sn' (shown by □ in FIG. 6) is sought from the quadratic approximation by using the values Sn-3~Sn-1, and this value Sn' is used as the error signal Sn.

As shown in FIG. 8, it can be seen that the value Sn' of the present invention closely resembles the true error signal Sn.

Further, if the signal Sn+1 is also judged as an abnormal signal, a value Sn+1' is similarly sought by using the values Sn-2~Sn, and the servo control is continued by using this sought value.

A key to the present invention is the accuracy of the approximation in a section A shown in FIG. 8. It is considered that an error signal available for a quadratic or cubic approximation can resemble the true value. If the accuracy of the approximation is not be available, it is possible to improve it by the following method.

In this method, an inclination is sought by the estimated values Sn' and Sn-1, and, if the inclination is great, the polynomial approximation (in the illustrated embodiment, quadratic approximation) is used, whereas, if the inclination is small, the first previous or prior error signal is used as it is, as in the conventional technique.

In the illustrated embodiment, while the servo control using the sample servo control was explained, the present invention can be effectively applied to an apparatus which controls the tracking servo control, focus servo control as well as the sample servo control in the time shared mode. For example, in the digital servo control apparatus, if the tracking servo control and the focus servo control are attempted to be effected simultaneously by the use of a single digital signal processing circuit, since it is impossible to perform two servo control simultaneously, the tracking servo control and the focus servo control should be performed alternately. The present invention is also useful in such a case.

What is claimed is:

1. An optical information recording and/or reproducing apparatus in which a tracking error signal is detected in a time shared mode and a tracking actuator is driven according to the detected tracking error signal to properly apply a light spot onto a recording medium to thereby effect at least one of recording and reproducing of information, said apparatus comprising:

detecting means for detecting a tracking error signal;

determining means for determining when a tracking error signal cannot be detected; and calculation means for calculating a tracking error signal according to a polynomial approximation on the basis of a plurality of tracking error signals previously detected, when a tracking error signal cannot be detected during a tracking error signal detecting operation, wherein said calculation means comprises means for calculating the tracking error signal on the basis of an equation:

$$S_n=(S_{n-1}-S_{n-2})+S_{n-1}$$

where $S_n$ is the calculated tracking error signal, $S_{n-1}$ is a tracking error signal obtained by the most recent prior detection, and $S_{n-2}$ is a tracking error signal obtained by the two most recent prior detections.

2. An optical information recording and/or reproducing apparatus according to claim 1, further comprising memory means for storing the tracking error signals.

3. An optical information recording and/or reproducing apparatus in which a tracking error signal is detected in a time shared mode and a tracking actuator is driven according to the detected tracking error signal to properly apply a light spot onto a recording medium to thereby effect at least one of recording and reproducing of information, said apparatus comprising:

detecting means for detecting a tracking error signal;

determining means for determining when a tracking error signal cannot be detected; and calculation means for calculating a tracking error signal according to a polynomial approximation on the basis of a plurality of tracking error signals previously detected, when a tracking error signal cannot be detected during a tracking error signal detecting operation, wherein said calculation means comprises means for calculating the tracking error signal on the basis of an equation:

$$S_n=(S_{n-3}+S_{n-2}+S_{n-1})/3+(S_{n-1}-S_{n-3})$$

where $S_n$ is the calculated tracking error signal, $S_{n-1}$ is a tracking error signal obtained in the most recent prior detection, $S_{n-2}$ is a tracking error signal obtained by the two most recent prior detections, and $S_{n-3}$ is a tracking error signal obtained by the three most recent prior detections.

4. An optical information recording and reproducing apparatus according to claim 3, further comprising memory means for storing the tracking error signals.

5. An optical information recording and/or reproducing apparatus in which a focusing error signal is detected in a time shared mode and a focusing actuator is driven according to the detected focusing error signal to properly apply a light spot onto a recording medium to thereby effect at least one of recording and reproducing of information, said apparatus comprising:

detecting means for detecting a focusing error signal;

determining means for determining when a focusing error signal cannot be detected; and calculation means for calculating a focusing error signal according to a polynomial approximation on the basis of a plurality of focusing error signals previously detected, when a focusing error signal cannot be detected during a focusing error signal detecting operation, wherein said calculation means comprises means for calculating the focusing error signal on the basis of an equation:

$$S_n=(S_{n-1}-S_{n-2})+S_{n-1}$$

where $S_n$ is the calculated focusing error signal, $Sn_{n-1}$ is a focusing error signal obtained by the most recent prior detection, and $S_{n-2}$ is a focusing error signal obtained by the two most recent prior detections.

6. An optical information recording and/or reproducing apparatus according to claim 5, further comprising memory means for storing the focusing error signals.

7. An optical information recording and/or reproducing apparatus in which a focusing error signal is detected in a time shared mode and a focusing actuator is driven according to the detected focusing error signal to properly apply a light spot onto a recording medium to thereby effect at least one of recording and reproducing of information, said apparatus comprising:

detecting means for detecting a focusing error signal;

determining means for determining when a focusing error signal cannot be detected; and calculation means for calculating a focusing error signal according to a polynomial approximation on the basis of a plurality of focusing error signals previously detected, when a focusing error signal cannot be detected during a focusing error signal detecting operation, wherein said calculation means comprises means for calculating the focusing error signal on the basis of an equation:

$$S_n=(S_{n-3}+S_{n-2}+S_{n-1})/3+(S_{n-1}-S_{n-3})$$

where $S_n$ is the calculated focusing error signal, $S_{n-1}$ is a focusing error signal obtained by the most recent prior detection, $S_{n-2}$ is a focusing error signal obtained by the two most recent prior detections and $S_{n-3}$ is a focusing error signal obtained by the three most recent prior detections.

8. An optical information recording and reproducing apparatus according to claim 7, further comprising memory means for storing the focusing error signals.

9. An optical information recording and/or reproducing method in which a tracking error signal is detected in a time shared mode and a tracking actuator is driven according to the tracking error signal to properly apply a light spot onto a recording medium to thereby effect at least one of recording and reproducing of information, said method comprising the steps of:

detecting a tracking error signal in a time shared mode;

determining whether the detected tracking error signal has a normal value or an abnormal value;

storing a value corresponding to the detected tracking error signal and driving the tracking actuator on the basis of the detected tracking error signal when it is determined in said determining step that the detected tracking error signal has a normal value; and calculating a tracking error signal using the stored values and driving the tracking actuator on the basis of the calculated tracking error signal when it is determined in said determining step that the detected tracking error signal has an abnormal value, wherein said calculating step is executed on the basis of an equation:

$$S_n=(S_{n-1}-S_{n-2})+S_{n-1}$$

where $S_n$ is the calculated tracking error signal, $S_{n-1}$ is a tracking error signal obtained by the most recent prior detection and $S_{n-2}$ is a tracking error signal obtained by the two most recent prior detections.

10. An optical information recording and/or reproducing method in which a focusing error signal is detected in a time shared mode and a focusing actuator is driven according to the focusing error signal to properly apply a light spot onto a recording medium to thereby effect at least one of recording and reproducing of information, said method comprising the steps of:

detecting a focusing error signal in a time shared mode;

determining whether the detected focusing error signal has a normal value or an abnormal value;

storing a value corresponding to the detected focusing error signal and driving the focusing actuator on the basis of the detected focusing error signal when it is determined in said determining step that the detected focusing error signal has a normal value; and calculating a focusing error signal using the stored values and driving the focusing actuator on the basis of the calculated focusing error signal when it is determined in said determining step that the detected focusing error signal has an abnormal value, wherein said calculating step is executed on the basis of an equation:

$$S_n=(S_{n-1}-S_{n-2})+S_{n-1}$$

where $S_n$ is the calculated tracking error signal, $S_{n-1}$ is a tracking error signal obtained by the most recent prior detection and $S_{n-2}$ is a tracking error signal obtained by the two most recent prior detections.

11. An optical information recording and/or reproducing method in which a tracking error signal is detected in a time shared mode and a tracking actuator is driven according to the tracking error signal to properly apply a light spot onto a recording medium to thereby effect at least one of recording and reproducing of information, said method comprising:

detecting a tracking error signal in a time shared mode;

a first determining step for determining whether the detected tracking error signal has a normal value or an abnormal value;

storing a value corresponding to the detected tracking error signal and driving the tracking actuator on the basis of the detected tracking error signal when it is determined in said first determining step that the detected tracking error signal has a normal value;

a second determining step for calculating a tracking error signal using the stored values and for determining a variation ratio of the calculated tracking error signal to the tracking error signal obtained by the most recent prior detection when it is determined in said first determining step that the detected tracking error signal has an abnormal value;

driving the tracking actuator on the basis of the calculated tracking error signal when it is determined in said second determining step that the variation ratio exceeds a predetermined value; and driving the tracking actuator on the basis of the tracking error signal obtained by the most recent prior detection when it is determined in said second determining step that the variation ratio is less than the predetermined value.

12. An optical information recording and/or reproducing method in which a focusing error signal is detected in a time shared mode and a focusing actuator is driven according to the focusing error signal to properly apply a light spot onto a recording medium to thereby effect at least one of recording and reproducing of information, said method comprising:

detecting a focusing error signal in a time shared mode;

a first determining step for determining whether the detected focusing error signal has a normal value or an abnormal value;

storing a value corresponding to the detected focusing error signal and driving the focusing actuator on the basis of the detected focusing error signal when it is determined in said first determining step that the detected focusing error signal has a normal value;

a second determining step for calculating a focusing error signal using the stored values and for determining a variation ratio of the calculated focusing error signal to the focusing error signal obtained by the most recent prior detection when it is determined in said first determining step that the detected focusing error signal has an abnormal value;

driving the focusing actuator on the basis of the calculated focusing error signal when it is determined in said second determining step that the variation ratio exceeds a predetermined value; and driving the focusing actuator on the basis of the focusing error signal obtained by the most recent prior detection when it is determined in said second determining step that the variation ratio is less than the predetermined value.

13. An optical information recording and/or reproducing apparatus in which a tracking error signal is detected in a time shared mode and a tracking actuator is driven according to the tracking error signal to properly apply a light spot onto a recording medium to thereby effect at least one of recording and reproducing of information, said apparatus comprising:

detecting means for detecting a tracking error signal in a time shared mode;

first determining means for determining whether the detected tracking error signal has a normal value or an abnormal value;

storing means for storing a value corresponding to the detected tracking error signal;

driving means for driving the tracking actuator;

calculation means for calculating a tracking error signal using the values stored by said storing means; and second determining means for determining a variation ratio of the calculated tracking error signal to the detected tracking error signal obtained by the most recent prior detection, wherein said driving means drives the tracking actuator on the basis of (i) the detected tracking error signal when said first determining means determines that the detected tracking error signal has a normal value, (ii) the tracking error signal obtained by the most recent prior detection when said first determining means determines that the detected tracking error signal has an abnormal value and said second determining means determines that the variation ratio is less than a predetermined value and (iii) the tracking error signal calculated by said calculation means when the first determining means determines that the detected tracking error signal has an abnormal value and said second determining means determines that the variation ratio exceeds the predetermined value.

14. An optical information recording and/or reproducing apparatus in which a focusing error signal is detected in a time shared mode and a focusing actuator is driven according to the focusing error signal to properly apply a light spot onto a recording medium to thereby effect at least one of recording and reproducing of information, said apparatus comprising:

detecting means for detecting a focusing error signal in a time shared mode;

first determining means for determining whether the detected focusing error signal has a normal value or an abnormal value;

storing means for storing a value corresponding to the detected focusing error signal;

driving means for driving the focusing actuator;

calculation means for calculating a focusing error signal using the values stored by said storing means; and second determining means for determining a variation ratio of the calculated focusing error signal to the detected focusing error signal obtained by the most recent prior detection, wherein said driving means drives the focusing actuator on the basis of (i) the detected focusing error signal when said first determining means determines that the detected focusing error signal has a normal value, (ii) the focusing error signal obtained by the most recent prior detection when said first determining means determines that the detected focusing error signal has an abnormal value and said second determining means determines that the variation ratio is less than a predetermined value and (iii) the focusing error signal calculated by said calculation means when the first determining means determines that the detected focusing error signal has an abnormal value and said second determining means determines that the variation exceeds the predetermined value.

15. An optical information recording and/or reproducing method in which a tracking error signal is detected in a time shared mode and a tracking actuator is driven according to the tracking error signal to properly apply a light spot onto a recording medium to thereby effect at least one of recording and reproducing of information, said method comprising the steps of:

detecting a tracking error signal in a time shared mode;

determining whether the detected tracking error signal has a normal value or an abnormal value;

storing a value corresponding to the detected tracking error signal and driving the tracking actuator on the basis of the detected tracking error signal when it is determined in said determining step that the detected tracking error signal has a normal value; and calculating a tracking error signal using the stored values and driving the tracking actuator on the basis of the calculated tracking error signal when it is determined in said determining step that the detected tracking error signal has an abnormal value, wherein said calculating step is executed on the basis of an equation $$S_n=(S_{n-3}+S_{n-2}+S_{n-1})/3+(S_{n-1}-S_{n-3})$$

where $S_n$ is the calculated tracking error signal, $S_{n-1}$ is a tracking error signal obtained by the most recent prior detection, $S_{n-2}$ is a tracking error signal obtained by the two most recent prior detections and $S_{n-3}$ is a tracking error signal obtained by the three most recent prior detections.

16. An optical information recording and/or reproducing method in which a focusing error signal is detected in a time shared mode and a focusing actuator is driven according to the focusing error signal to properly apply a light spot onto a recording medium to thereby effect at least one of recording and reproducing of information, said method comprising the steps of:

detecting a focusing error signal in a time shared mode;

determining whether the detected focusing error signal has a normal value or an abnormal value;

storing a value corresponding to the detected focusing error signal and driving the focusing actuator on the basis of the detected focusing error signal when it is determined in said determining step that the detected focusing error signal has a normal value; and calculating a focusing error signal using the stored values and driving the focusing actuator on the basis of the calculated focusing error signal when it is determined in said determining step that the detected focusing error signal has an abnormal value, wherein said calculating step is executed on the basis of an equation:

$$S_n=(S_{n-3}+S_{n-2}+S_{n-1})/3+(S_{n-1}-S_{n-3})$$

where $S_n$ is the calculated tracking error signal, $S_{n-1}$ is a tracking error signal obtained by the most recent prior detection, $S_{n-2}$ is a tracking error signal obtained by the two most recent prior detections and $S_{n-3}$ is a tracking error signal obtained by the three most recent detections.

17. An optical information recording and/or reproducing apparatus in which a tracking error signal is detected in a time shared mode and a tracking actuator is driven according to the detected tracking error signal to properly apply a light spot onto a recording medium to thereby effect at least one of recording and reproducing of information, said apparatus comprising:

detecting means for detecting a tracking error signal; and calculation means for calculating a tracking error signal on the basis of a plurality of tracking error signals previously detected, when a tracking error signal cannot be detected, wherein said calculation means calculates the tracking error signal on the basis of an equation:

$$S_n=(S_{n-1}-S_{n-2})+S_{n-1}$$

where $S_n$ is the calculated tracking error signal, $S_{n-1}$ is a tracking error signal obtained by the most recent prior detection, and $S_{n-2}$ is a tracking error signal obtained by the two most recent prior detections.

18. An optical information recording and/or reproducing apparatus in which a tracking error signal is detected in a time shared mode and a tracking actuator is driven according to the detected tracking error signal to properly apply a light spot onto a recording medium to thereby effect at least one of recording and reproducing of information, said apparatus comprising:

detecting means for detecting a tracking error signal; and calculation means for calculating a tracking error signal on the basis of a plurality of tracking error signals previously detected, when a tracking error signal cannot be detected, wherein said calculation means calculates the tracking error signal on the basis of an equation:

$$S_n=(S_{n-3}+S_{n-2}+S_{n-1})/3+(S_{n-1}-S_{n-3})$$

where $S_n$ is the calculated tracking error signal, $S_{n-1}$ is a tracking error signal obtained in the most recent prior detection, $S_{n-2}$ is a tracking error signal obtained by the two most recent prior detections, and $S_{n-3}$ is a tracking error signal obtained by the three most recent prior detections.

19. An optical information recording and/or reproducing apparatus in which a focusing error signal is detected in a time shared mode and a focusing actuator is driven according to the detected focusing error signal to properly apply a light spot onto a recording medium to thereby effect at least one of recording and reproducing of information, said apparatus comprising:

detecting means for detecting a focusing error signal; and calculation means for calculating a focusing error signal on the basis of a plurality of focusing error signals previously detected, when a focusing error signal cannot be detected, wherein said calculation means calculate the focusing error signal on the basis of an equation:

$$S_n=(S_{n-1}-S_{n-2})+Sn_{n-1}$$

where $S_n$ is the calculated focusing error signal, $S_{n-1}$ is a focusing error signal obtained by the most recent prior detection, and $S_{n-2}$ is a focusing error signal obtained by the two most recent prior detections.

20. An optical information recording and/or reproducing apparatus in which a focusing error signal is detected in a time shared mode and a focusing actuator is driven according to the detected focusing error signal to properly apply a light spot onto a recording medium to thereby effect at least one of recording and reproducing of information, said apparatus comprising:

detecting means for detecting a focusing error signal; and calculation means for calculating a focusing error signal on the basis of a plurality of focusing error signals previously detected, when a focusing error signal cannot be detected, wherein said calculation means calculates the focusing error signal on the basis of an equation:

$$S_n=(S_{n-3}+S_{n-2}+S_{n-1})/3+(S_{n-1}-S_{n-3})$$

where $S_n$ is the calculated focusing error signal, $S_{n-1}$ is a focusing error signal obtained by the most recent prior detection, $S_{n-2}$ is a focusing error signal obtained by the two most recent prior detections and $S_{n-3}$ is a focusing error signal obtained by the three most recent prior detections.

* * * * *

UNITED STATES PATENT AND TRADEMARK OFFICE
CERTIFICATE OF CORRECTION

PATENT NO. : 5,483,510
DATED : January 9, 1996
INVENTOR(S) : Tsukasa OGINO

It is certified that error appears in the above-indentified patent and that said Letters Patent is hereby corrected as shown below:

COLUMN 1:

Line 26, "an" should read --such an--.

COLUMN 3:

Line 6, "the" should read --an--;
    Line 7, "the" should read --an--.

COLUMN 4:

Line 61, "embodiments." should read --embodiment.--.

COLUMN 5:

Line 66, "be" should be deleted.

COLUMN 6:

Line 15, "control" should read --controls--.

UNITED STATES PATENT AND TRADEMARK OFFICE
CERTIFICATE OF CORRECTION

PATENT NO. : 5,483,510
DATED : January 9, 1996
INVENTOR(S) : Tsukasa OGINO

It is certified that error appears in the above-indentified patent and that said Letters Patent is hereby corrected as shown below:

COLUMN 7:

Line 6, "and" should read --and/or--;
    Line 31, "$Sn_{n-1}$" should read --$S_{n-1}$--;
    Line 65, "and" should read --and/or--.

COLUMN 12:

Line 4, "$s_n$" should read --$S_n$--;
    Line 47, "$S_n=(S_{n-1}-S_{n-2})+Sn_{n-1}$" should read --$S_n=(S_{n-1}-S_{n-2})+S_{n-1}$--.

Signed and Sealed this

Twenty-fifth Day of June, 1996

Attest:

BRUCE LEHMAN

*Attesting Officer*      *Commissioner of Patents and Trademarks*